United States Patent [19]

Goebel et al.

[11] 4,416,957

[45] Nov. 22, 1983

[54] ELECTROCHEMICAL CELL

[75] Inventors: Franz Goebel, Sudbury; Robert C. McDonald, Stow, both of Mass.

[73] Assignee: GTE Products Corporation, Stamford, Conn.

[21] Appl. No.: 354,276

[22] Filed: Mar. 3, 1982

[51] Int. Cl.³ .............................................. H01M 6/14
[52] U.S. Cl. ..................................... 429/91; 429/101; 429/196; 429/218
[58] Field of Search .................. 429/91, 90, 101, 196, 429/218, 178, 197

[56] References Cited

U.S. PATENT DOCUMENTS

| | | | |
|---|---|---|---|
| 4,025,700 | 5/1977 | Fagan, Jr. | 429/91 |
| 4,132,836 | 1/1979 | Greatbatch | 429/91 |
| 4,247,606 | 1/1981 | Uetani et al. | 429/91 |
| 4,247,607 | 1/1981 | O'Boyle | 429/101 |
| 4,293,622 | 10/1981 | Marincic et al. | 429/50 |
| 4,371,592 | 2/1983 | Gabano | 429/91 |
| 4,375,502 | 3/1983 | Gabano | 429/196 X |

*Primary Examiner*—Anthony Skapars
*Attorney, Agent, or Firm*—Peter Xiarhos; David M. Keay

[57] ABSTRACT

A primary electrochemical cell operative to provide a warning indication toward the end of discharge of the cell signalling an approaching end-of-life of the cell. The cell includes a tubular porous carbon cathode structure disposed within a metal housing of the cell together with an anode structure and an electrolytic solution.

The anode structure includes first and second electrochemically active elements, for example, lithium and calcium, having different oxidation potentials within the cell and consumable by electrochemical action within the cell during discharge of the cell. The consumption of the active elements during discharge of the cell results in the establishment of different and distinguishable operating voltages for the cell. The active elements are arranged with respect to each other such that the active element of higher oxidation potential (i.e., the lithium) is consumed prior to the other active element (i.e., the calcium). The change in value of the operating voltage of the cell due to successive consumptions of the two active elements is detected to provide a warning indication signalling the approaching end-of-life of the cell.

12 Claims, 2 Drawing Figures

ELECTROCHEMICAL CELL

CROSS-REFERENCE TO RELATED APPLICATIONS

In co-pending application Ser. No. 354,275, filed concurrently herewith in the name of Franz Goebel, and entitled "ELECTROCHEMICAL CELL", there is disclosed and claimed a button-type electrochemical cell capable of providing a warning indication signalling an approaching end-of-life of the cell.

In co-pending application Ser. No. 333,094, filed Dec. 21, 1981, now U.S. Pat. No. 4,376,811, in the name of Franz Goebel, and entitled "ELECTROCHEMICAL CELL", there is disclosed and claimed an electrochemical cell of a cylindrical design utilizing components similar to those employed by an electrochemical cell as disclosed and claimed in the present application.

FIELD OF THE INVENTION

The present invention relates to an electrochemical cell and, more particularly, to a primary electrochemical cell operative to provide a warning indication toward the end of discharge of the cell signalling an approaching end-of-life of the cell.

BACKGROUND OF THE INVENTION

Primary electrochemical cells are generally well known and available in a variety of sizes and shapes. One well known form of a primary electrochemical cell is a cylindrical cell including a battery stack disposed within a generally cylindrical metal housing and exposed to and permeated by an electrolytic solution. U.S. Pat. No. 4,060,668, in the name of Franz Goebel and assigned to GTE Laboratories Incorporated, discloses a cylindrical primary electrochemical cell having a battery stack including a lithium anode, a carbon current collector cathode structure, and a separator of insulative material interposed between the lithium anode and the carbon current collector cathode structure. The lithium anode takes the form of a cylindrical sheet physically pressed against an interior wall of the metal housing, and is arranged concentrically within the housing with the carbon current collector cathode structure and the separator. A preferred electrolytic solution for the above-described cell includes a reducible soluble cathode and an electrolyte solute dissolved in the reducible soluble cathode. Suitable materials for the reducible soluble cathode and the electrolyte solute are thionyl chloride and lithium tetrachloroaluminate, respectively.

In co-pending application Ser. No. 333,094, filed Dec. 21, 1981, in the name of Franz Goebel, entitled "ELECTROCHEMICAL CELL" and assigned to the same assignee as the present application, an alternative construction of a cylindrical cell is disclosed in which a cylindrical, generally-solid lithium anode is disposed centrally within a cylindrical metal housing of the cell and surrounded, in turn, by a separator of insulative material and a carbon cathode structure. These components of the cell are also exposed to an electrolytic solution of the same type and composition as disclosed in U.S. Pat. No. 4,060,668 briefly discussed hereinabove.

While both of the cylindrical cells as described hereinabove operate in a satisfactory manner, neither has the capability of providing a warning signal, indication, or other condition toward the end of discharge of the cell indicating that the cell is approaching the end of its useful or rated life. Such an indication may be useful, for example, in applications in which an early and timely replacement of the cell is necessary or desirable.

Cells capable of providing end-of-life warning indications as described above are disclosed in U.S. Pat. Nos. 4,247,607 and 4,293,622. In U.S. Pat. No. 4,247,607, a disc or button-type lithium halide primary cell is disclosed including a lithium anode in contact with an iodine/polymer depolarizer and having a step portion comprising about 15 to 5% of the total thickness of the anode and a surface area of from about 40 to 60% of the surface area of the major surface in contact with the depolarizer. An indication of approaching end of life is provided by a substantial, detectable increase in the internal impedance of the cell when only 5 to 15% of the unused lithium anode remains. In U.S. Pat. No. 4,293,622, a lithium/thionyl chloride cell is disclosed in which the electrochemically active components of the cell, including the electrolytic solution, are selected so that the electrolytic solution is exhausted during discharge before the other active components. As a result, a detectable step or transition occurs in the output voltage of the cell which serves as an indication of impending cell discharge. A disadvantage of the cell design of this latter patent is that the limiting of the amount of electrolytic solution makes less of the electrolytic solution available for absorbing soluble gaseous discharge products, such as sulfur dioxide, with the result that an undesirable increase in internal cell pressure may occur.

BRIEF SUMMARY OF THE INVENTION

In accordance with the present invention, an electrochemical cell is provided which is capable of producing an end-of-life warning indication and which avoids shortcomings of prior art devices. The electrochemical cell in accordance with the invention includes a housing within which an electrolytic solution and a battery stack, representing the electrochemical system of the cell, are provided. The battery stack includes a cathode and an anode structure spaced from the cathode and the housing.

The anode structure in accordance with the invention includes first and second active elements. The first active element is of a first material having a first oxidation potential within the cell and is consumed by electrochemical action within the cell during discharge of the cell as a result of which a first value of operating voltage for the cell is established during the discharge of the cell and the consumption of the first active element. The second active element is of a second material having a second oxidation potential within the cell and is consumed by electrochemical action within the cell during discharge of the cell as a result of which a second, different value of operating voltage for the cell is established during the discharge of the cell and the consumption of the second active element. The first and second active elements are arranged with respect to each other in accordance with the invention so that one of the active elements is consumed before the other whereby the value of operating voltage of the cell changes from one of its two values to the other of its two values. This change in the value of the operating voltage may be utilized as an end-of-life indication.

DETAILED DESCRIPTION OF THE INVENTION

Figure 1:
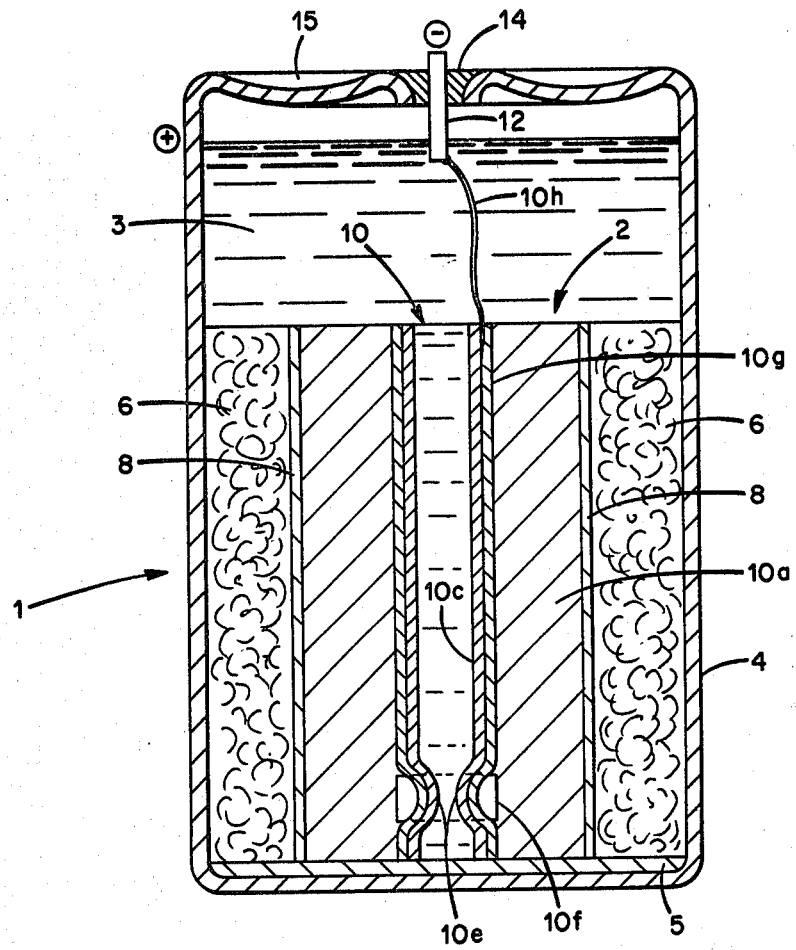
FIG. 1 is an elevational view, partly in cross section and with portions exaggerated for the sake of clarity, of a cylindrical primary electrochemical cell in accordance with the invention capable of providing a warning condition toward the end of discharge of the cell signalling an approaching end-of-life of the cell.

Referring now to FIG. 1, there is shown a primary electrochemical cell 1 in accordance with the present invention. The cell 1 is of a general type as described in the aforementioned co-pending application Ser. No. 333,094 and, as shown in FIG. 1, includes a battery stack 2 employed together with an electrolytic solution 3 within an elongated cylindrical metal casing or housing 4 of the cell 1. The battery stack 2 and the electrolytic solution 3 collectively represent the electrochemical system of the cell. The battery stack 2 employed within the cell 1 is insulated from the housing of the cell by a suitable porous insulator 5 (e.g., of glass paper), and generally includes a concentric arrangement of a porous carbon cathode structure 6, a thin porous separator 8, and an anode structure 10. As will be discussed in detail hereinafter, the anode structure 10 is constructed in accordance with the invention so as to alter the operating voltage of the cell 1 as the end of the life of the cell approaches, thereby to provide a warning condition signalling the approaching end-of-life of the cell.

The porous carbon cathode structure 6 is a generally cylindrical, elongated tubular member comprising an aggregation of discrete, semi-rigid, porous carbon conglomerates. These conglomerates generally contain a combination of carbon black and a binder such as "Teflon". The carbon cathode structure 6 may be formed from the conglomerates into a single-piece component as shown in FIG. 1 or, alternatively, the carbon cathode structure 6 may be constructed of a pre-selected number of individual annular or "donut" shaped discs superimposed upon each other in a vertical stacked array to effectively form a single carbon cathode structure of essentially any desired overall length. Suitable approximate dimensions for the carbon cathode structure 6 for an AA-size cell are a length of 1.5 inch, an outside diameter of 0.5 inch, and an inside diameter of 0.3 inch. Because of the porous nature of the constituent components of the conglomerates used to form the carbon cathode structure 6, the carbon cathode structure 6 has a resultant network of electrolyte-conducting channels formed therein whereby the carbon cathode structure 6 can be readily permeated by the electrolytic solution 3. Techniques for producing the conglomerates employed by the carbon cathode structure 6 are generally described in U.S. Pat. No. 4,161,063 to which reference may be made for specific details.

The aforementioned porous separator 8 is disposed intermediate to the carbon cathode structure 6 and the anode structure 10 and is used to electrically isolate the carbon cathode structure 6 from the anode structure 10. The separator 8 typically takes the form of a cylindrical sheet of a standard, electrically nonconductive material such as glass paper.

The anode structure 10 as utilized within the cell 1 is located centrally within the cell 1 and, as shown in FIG. 1, generally includes a solid, elongated, cylindrical electrode 10a of a first consumable active metal; an elongated electrically-nonconductive member 10c disposed within the electrode 10a and having a necked-down portion 10e of a diameter and cross section less than the rest of the member 10c; an element 10f of a second consumable active metal and disposed on the member 10c adjacent to the necked-down portion 10e of the member 10c and completely surrounded by the material of the metal electrode 10a; an electrically-conductive terminal element 10g disposed on the member 10c within the electrode 10a and in physical and electrical contact with the consumable metal electrode 10a and the consumable element 10f; and a thin, flexible, electrically-conductive metal jumper element 10h physically and electrically connected between the electrically-conductive terminal element 10g and an elongated, hollow, metal feedthrough member 12.

The electrode 10a of the anode structure 10 is typically of an oxidizable active consumable alkali metal such as lithium, which has a high oxidation potential, for example, 3.68 volts (in thionyl chloride). Suitable approximate dimensions for the electrode 10a are a length of 1.5 inch and an outside diameter of approximately 0.3 inch.

The aforementioned electrically-nonconductive member 10c may take the form of a hollow glass or ceramic tube as shown in FIG. 1 or a glass or ceramic rod. The tube form of the member 10c may be preferred for many applications in which it is desired to provide an additional amount of electrolytic solution in the cell, for example, to increase the efficiency of utilization (depletion) of the consumable metals in the cell. In this case, the hollow tube serves as a simple and convenient reservoir or cavity for the retention therein of the additional or excess amount of electrolytic solution. Suitable approximate dimensions for the member 10c are a length of 1.5 inch, an outside diameter of 0.080 inch for the necked-down portion 10e, a diameter of 0.125 inch for the rest of its length, and a wall thickness (for a hollow tube) of 0.04 inch.

The aforementioned active element 10f disposed on the member 10c adjacent to the necked-down portion 10e typically takes the form of a ring and is typically of an oxidizable active consumable alkaline earth metal such as calcium, which has a lower oxidation potential than the lithium electrode 10a, for example, 3.0 volts (in thionyl chloride). A suitable diameter for the element 10f is 0.125 inch and a suitable thickness therefor is 0.020 inch. Although calcium is the present preferred material for the active element 10f, other possible materials may also be used for the active element 10f, for example, alloys of alkali metals such as lithium aluminum alloys and lithium boron alloys having suitable oxidation potentials compatible with the lithium metal of the electrode 10a.

The aforementioned electrically-conductive terminal element 10g disposed on the member 10c may take the form of an electrically-conductive non-consumable metal coating or, alternatively, an elongated, thin, non-consumable metal wire or strip wound or wrapped about the upper portion of the member 10c. A suitable material for the metal coating or wire or strip is nickel, and a suitable thickness therefor is 0.005 inch.

The aforementioned jumper element 10h may be of nickel and in the form of a wire or flat ribbon, and may be secured to the electrically-conductive terminal element 10g in any suitable manner. By way of example, a first end of the jumper element 10h may simply be welded directly to the terminal element 10g or, alternatively, embedded together with the terminal element 10g within the lithium electrode 10a as generally indicated in FIG. 1. The other end of the jumper element 10h is secured, as by welding, to the aforementioned cylindrical, hollow, metal (e.g., nickel) feedthrough member 12. The feedthrough member itself passes through a standard insulative glass or ceramic-to-metal seal 14 provided within an hermetically sealed metal cap or cover 15 of the cell 1. The jumper element 10h, by virtue of its non-rigid, flexible nature and small thickness, for example, 0.005–0.015 inch, serves to absorb any shock or vibration to which the cell 1 might be exposed, thereby to prevent a break in the physical and electrical connection between the electrically-conductive terminal element 10g and the feedthrough member 12, and also to minimize the possibility of physical damage (e.g., breakage) to the glass or ceramic-to-metal seal 14 due to such factors as shock and vibration.

The hollow nature of the feedthrough member 12 as described hereinabove serves to permit the introduction of the electrolytic solution 3 into the cell 1 for permeating the porous components of the battery stack 2 and, if the electrically-nonconductive member 10c is in the form of a hollow tube as shown in FIG. 1, to fill the cavity in the tube with electrolytic solution. Following the above filling operation, the feedthrough member 12 is closed at its outside opening, as by welding. The feedthrough member 12 thereupon serves as the negative terminal of the cell 1. The housing 4 of the cell 1, which may be of stainless steel and against which the aforedescribed carbon cathode structure 6 physically abuts, serves as the positive terminal of the cell 1.

A suitable and preferred electrolytic solution 3 which may be used with the above-described cell 1 is a cathodelectrolyte solution including a reducible soluble cathode, such as thionyl chloride, and an electrolyte solute, such as lithium tetrachloroaluminate, dissolved in the thionyl chloride.

In the operation of the cell 1 as described hereinabove, specifically, during normal discharge of the cell 1, the reducible soluble cathode, namely, the thionyl chloride, is catalytically reduced at the surface of the carbon cathode structure 6. The catalytic reduction results, inter alia, in the formation of a variety of reaction products within the cell and, as determined by the rate of this catalytic reduction, a gradual depletion of both of the active metals, i.e., the lithium and calcium, and also a depletion of the thionyl chloride. The lithium and calcium metals are selected quantitatively relative to the electrolytic solution 3 so as to be depleted prior to the depletion of the thionyl chloride in the electrolytic solution. By virtue of the fact that the consumable active calcium metal of the element 10f is surrounded by the consumable active lithium metal of the electrode 10a, the lithium metal is consumed first, specifically, in a radial direction from the outside toward the inside of the electrode 10a, and followed by the consumption of the calcium metal.

Figure 2:
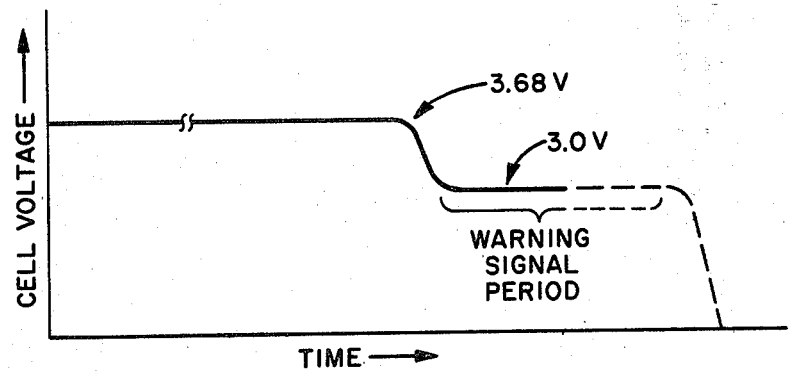
FIG. 2 is a discharge curve of operating voltage versus time for the cell of FIG. 1 illustrating the occurrence of the warning condition representing the approaching end-of-life of the cell.

The transition from the depletion of the lithium to the calcium occurs toward the end of the life of the cell and results in a drop in operating voltage of the cell due to the lower oxidation potential for the calcium than the lithium. This drop in voltage is depicted in FIG. 2 and is utilized, until such time as all of the calcium has been depleted, to represent a warning signal period indicating the approaching or impending end-of-life of the cell. This period may also be used to initiate some other action, for example, switching a load (not shown) powered by the cell to a standby cell or activating external circuitry. The period effectively ends when all of the calcium has been depleted (which depends on the amount of the calcium), thereby effectively marking the end of the useful or rated life span of the cell. The drop in operating voltage of the cell 1 as described hereinabove is clear and unambiguous and capable of being detected and monitored to allow sufficient time for replacing the cell or initiating other appropriate action. Further, during the warning period, the operating voltage of the cell 1 is still large enough, for example, about 3.0 volts, to ensure that a load connected across and powered by the cell continues to be supplied with ample voltage for ensuring its continued operation.

While there has been described what is considered to be a preferred embodiment of the invention, it will be apparent to those skilled in the art that various changes and modifications may be made therein without departing from the invention as called for in the appended claims.

What is claimed is:

1. An electrochemical cell comprising:

a housing;

an electrochemical system within the housing and including an electrolytic solution and a battery stack exposed to said electrolytic solution, said battery stack comprising:

a cathode; and an anode structure spaced from the cathode and the housing, said anode structure comprising:

a first active element of a first material having a first oxidation potential within the cell, said first active element being consumed by electrochemical action within the cell during discharge of the cell and establishing a first value of operating voltage for the cell during discharge of the cell and the consumption of the first active element; and a second active element of a second material having a second oxidation potential within the cell, said second active element being consumed by electrochemical action within the cell during discharge of the cell and establishing a second, different value of operating voltage for the cell during discharge of the cell and the consumption of the second active element;

said first and second active elements being arranged with respect to each other so that one of the active elements is consumed before the other whereby the value of operating voltage of the cell changes from one of its two values to the other of its two values;

wherein:

the electrolytic solution includes a catalytically-reducible soluble cathode;

the cathode of the battery stack is a porous carbon structure adjacent to an interior wall of the housing and operative during discharge of the cell to catalytically reduce the soluble cathode of the electrolytic solution; and the first active element is of a material having a greater oxidation potential within the cell than that of the second active element and surrounds the second active element.

2. An electrochemical cell in accordance with claim 1 wherein:

the reducible soluble cathode of the electrolytic solution is thionyl chloride;

the carbon cathode structure comprises an aggregation of porous carbon conglomerates permeable by the electrolytic solution and defining a surface area for the catalytic reduction of the thionyl chloride in the electrolytic solution;

the first active element is of a first metal; and the second active element is of a second metal.

3. An electrochemical cell in accordance with claim 2 wherein:

the first active element is of lithium; and the second active element is of calcium.

4. An electrochemical cell in accordance with claim 3 wherein:

the thionyl chloride is consumed during discharge of the cell by electrochemical action within the cell; and the lithium and calcium metals are selected so as to be consumed during discharge of the cell prior to the consumption of the thionyl chloride.

5. A primary electrochemical cell comprising:

a metal housing and a cover for said housing, said cover having a metal electrical terminal extending therethrough;

an electrochemical system within the housing and including an electrolytic solution and a battery stack exposed to said electrolytic solution, said electrolytic solution including a catalytically-reducible soluble cathode, and said battery stack comprising:

a cathode structure adjacent to the metal housing and operating during discharge of the cell to catalytically reduce the soluble cathode of the electrolytic solution; and an anode structure comprising:

a first active element of a first material spaced from the cathode structure and the metal housing, said first active element having a first oxidation potential within the cell and being consumed by electrochemical action within the cell during discharge of the cell and establishing a first value of operating voltage for the cell during discharge of the cell and the consumption of the first active element;

a second active element of a second material having a second oxidation potential within the cell, said second active element being consumed by electrochemical action within the cell during discharge of the cell and establishing a second, different value of operating voltage for the cell during discharge of the cell and the consumption of the second active element;

said first and second active elements being arranged with respect to each other so that one of the active elements is consumed before the other whereby the value of operating voltage of the cell changes from one of its two values to the other of its two values; and an electrical terminal assembly physically and electrically connected to, and between, the combination of the first and second active elements and the metal electrical terminal in the cover of the housing for the detection at the metal electrical terminal in the cover of the first and second operating voltages and changes in the values thereof;

wherein:

the metal housing is an elongated cylindrical housing;

the cathode structure is an elongated, cylindrical, porous, tubular carbon member;

the first active element is a generally elongated cylindrical element disposed within and spaced from the carbon cathode structure, said cylindrical active element having an oxidation potential within the cell greater than that of the second active element; and the second active element is positioned adjacent to and surrounded by the active cylindrical element.

6. A primary electrochemical cell in accordance with claim 5 wherein:

the cylindrical active element is of a first metal; and the second active element is of a second metal.

7. A primary electrochemical cell in accordance with claim 6 wherein:

the cylindrical active element is of lithium; and the second active element is of calcium.

8. A primary electrochemical cell in accordance with claim 5 further comprising:

an elongated electrically-nonconductive member disposed within the cylindrical active element and having a portion of reduced diameter and cross section than the remainder thereof;

and wherein:

the second active element is in the form of a ring and is physically disposed on the reduced diameter and cross section portion of the electrically-nonconductive member.

9. A primary electrochemical cell in accordance with claim 8 wherein:

the reducible soluble cathode of the electrolytic solution is thionyl chloride;

the elongated, cylindrical, porous, tubular carbon cathode member comprises an aggregation of porous carbon conglomerates permeable by the electrolytic solution and defining a surface area for the catalytic reduction of the thionyl chloride in the electrolytic solution;

the cylindrical active element is of lithium; and the active ring element is of calcium.

10. A primary electrochemical cell in accordance with claim 9 wherein:

the thionyl chloride is consumed during discharge of the cell; and the lithium and calcium are selected so as to be consumed during discharge of the cell prior to the consumption of the thionyl chloride.

11. A primary electrochemical cell in accordance with claim 10 wherein:

the elongated electrically-nonconductive member is of glass.

12. A primary electrochemical cell in accordance with claim 10 wherein:

the elongated electrically-nonconductive member is of a ceramic material.

* * * * *